United States Patent
Darlington, Jr. et al.

(10) Patent No.: US 6,783,802 B2
(45) Date of Patent: Aug. 31, 2004

(54) HYDRAULIC BARRIER

(75) Inventors: Jerald W. Darlington, Jr., Marengo, IL (US); Natalie A. Dotlich, Buffalo Grove, IL (US); Craig M. Mattern, West Chicago, IL (US); Richard Wilson Carriker, Woodstock, GA (US); Mark William Clarey, Chatsworth, GA (US)

(73) Assignee: Amcol International Corporation, Arlington Heights, IL (US)

( * ) Notice: Subject to any disclaimer, the term of this patent is extended or adjusted under 35 U.S.C. 154(b) by 140 days.

(21) Appl. No.: 10/254,734

(22) Filed: Sep. 25, 2002

(65) Prior Publication Data

US 2004/0058077 A1 Mar. 25, 2004

(51) Int. Cl.$^7$ ................................. B05D 1/36
(52) U.S. Cl. ........................................ 427/333
(58) Field of Search ........................... 427/333

(56) References Cited

FOREIGN PATENT DOCUMENTS

| KR | 2001/008228 | * | 2/2001 |
| WO | WO 00/72958 | * | 12/2000 |
| WO | WO 00/73596 | * | 12/2000 |

OTHER PUBLICATIONS

Janotka et al, Applied Clay Science, 21(1–2), pp 21–31, 2002.*

* cited by examiner

Primary Examiner—Erma Cameron
(74) Attorney, Agent, or Firm—Marshall, Gerstein & Borun LLP

(57) ABSTRACT

By applying a polymerization catalyst or polymerization initiator directly to a liquid-absorbent or liquid-adsorbent (hereinafter collectively referred to as "liquid-sorbent") substrate, preferably a porous geotextile in sheet material form, to form a polymerization-initiating substrate or sheet material, a slurry of a monomer and a water-absorbent clay that is subsequently embedded in the porous substrate will have its monomer content sufficiently contacted by the polymerization catalyst or polymerization initiator for complete polymerization of the embedded monomer to form embedded polymer solids and clay, without the monomer partially polymerizing before contacting the substrate. It has been found that polymerization of the monomer while in contact with the substrate achieves best results in retention of embedded and interlocked polymer and clay solids. Preferably only the polymerization catalyst or polymerization initiator, and optionally a cross-linker for the monomer, and/or a polymer neutralizing agent, together with any carrier, such as water or an organic solvent, are applied to the liquid-sorbent substrate prior to embedding the monomer into the substrate. In another embodiment, the cross-linker and/or the polymer neutralizing agent are embedded into the substrate together with the polymerization catalyst and/or polymerization initiator.

41 Claims, 1 Drawing Sheet

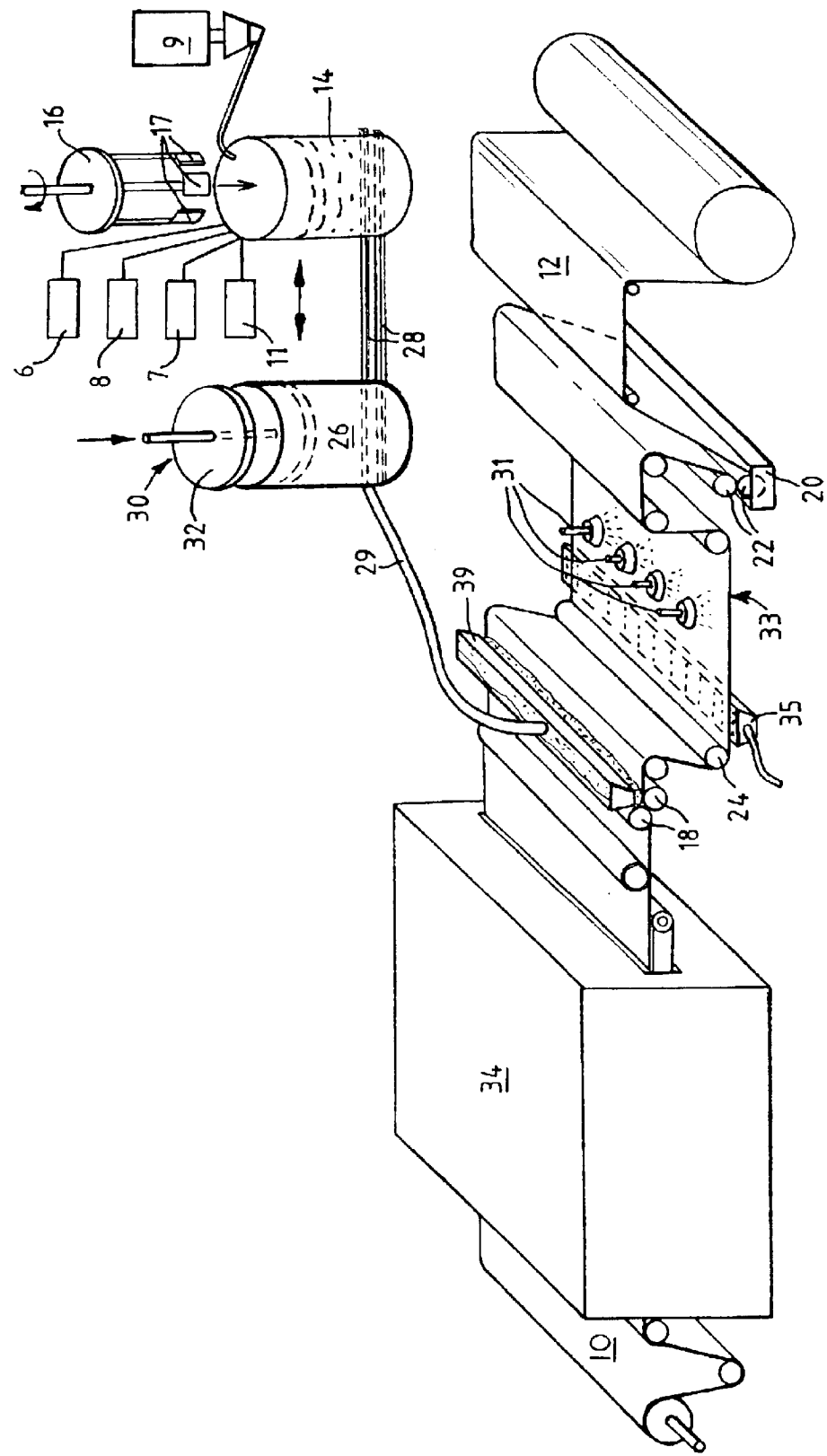

HYDRAULIC BARRIER

FIELD OF THE INVENTION

The present invention is directed to a method of manufacturing a polymer/clay slurry-filled sheet material, and particularly to a continuous method of manufacturing the polymer/clay-filled sheet material including a step of embedding a high viscosity aqueous polymerization solution, containing a polymerizable monomer and a water swellable clay, in the form of a slurry, into a liquid-absorbent or liquid adsorbent substrate that contains a polymerization catalyst and/or a polymerization initiator for subsequent polymerization of the monomer, without premature polymerization of the monomer. In the preferred embodiment, the monomer is polymerized, in-situ, at a temperature sufficient to vaporize the slurry water, e.g., at least 100° C. at atmospheric pressure.

BACKGROUND OF THE INVENTION

Published PCT application WO 00/72958 A1 ('958) describes a porous substrate, such as a geotextile liner, containing a polymer, such as polyacrylamide and/or a polyacrylic acid, that is partially neutralized (e.g., polyacrylic acid and sodium polyacrylate), and preferably also clay. The polymer is formed for the most part, in situ, while the monomer is embedded into the geotextile, together with the clay, to provide a hydraulic barrier that has excellent, low hydraulic conductivity and has a significantly lower weight of active barrier material than the weight of active barrier material contained in geosynthetic liners in existence at the time of the '958 invention. Further, as disclosed in the '958 publication, there may be some synergy in the combination of a polymerizable monomer, such as acrylic acid, and clay by virtue of intercalation of the monomer between the clay platelets to form an intercalate during the mixing of the monomer and clay to form a slurry for embedment into a geotextile and/or during the embedding of the slurry into the geotextile.

It has been found that the manufacture of an article, in accordance with WO 00/72958 results in a product that contains a substantial percentage of water, making it more difficult to apply the product over a surface to be protected against water penetration, and making shipping of the product more expensive, thereby detracting from the low weight advantage and cost savings attributed to having less active barrier material in the geotextile. Further, in accordance with WO 00/72958 A1, an aqueous polymerization solution, a polymerization catalyst, and a cross-linker are premixed and embedded into the porous substrate simultaneously during continuous manufacture. It has been found that only small batches of the polymerizable monomer can be prepared or the polymerizable monomer will begin to polymerize prior to embedding the polymerization solution into the porous substrate resulting in lower hydraulic barrier properties and decreased retention of solids.

SUMMARY OF THE INVENTION

In accordance with the method of manufacture described herein, it has been found that by applying a polymerization catalyst or polymerization initiator directly to a liquid-absorbent or liquid adsorbent (hereinafter collectively referred to as "liquid-sorbent") substrate, preferably a porous geotextile in sheet material form, to form a polymerization-initiating substrate or sheet material, a slurry of water, clay, and a polymerizable monomer that is subsequently embedded in the polymerization-initiating substrate will be completely contacted by the polymerization catalyst or polymerization initiator for complete polymerization of the embedded monomer to form embedded polymer solids, without the monomer partially polymerizing before contacting the substrate. It has been found that complete polymerization of the monomer while in contact with the polymerization-initiating substrate achieves best results in retention of embedded and interlocked polymer solids. Preferably only the polymerization catalyst or polymerization initiator, and optionally a cross-linker for the monomer, and/or a polymer neutralizing agent, together with any carrier, such as water or an organic solvent, are applied to the liquid-sorbent substrate prior to embedding the monomer into the substrate.

In accordance with the method disclosed herein, an aqueous polymerization solution containing a polymerizable monomer and clay that is void of polymerization catalyst or polymerization initiator can be mixed in large batches, and the batches will not polymerize prematurely, prior to being embedded into the liquid-sorbent substrate. Further, by providing a liquid-monomer absorbent or liquid monomer adsorbent substrate containing the polymerization catalyst or polymerization initiator, an effective polymerization solution containing a polymerizable monomer and clay, in the form of a monomer clay slurry, can be conveyed to the substrate with a minimum amount of carrier, such as water and/or organic solvent, such that the monomer/clay-containing polymerization solution is easily embedded into the catalyst-containing substrate, to minimize drying time and solvent expense.

Accordingly, one aspect of the articles and methods described herein is to provide a method of manufacturing a sheet material containing an embedded polymer that is polymerized, in-situ, essentially only while in contact with a liquid-sorbent polymerization initiating substrate by embedding a polymerizable monomer/clay slurry, that is void of polymerization catalyst and polymerization initiator, into a liquid-sorbent polymerization-initiating substrate for contact with the polymerization catalyst and/or polymerization initiator and subsequent contact with the polymerizable monomer for polymerization, in-situ. The embedded monomer is polymerized only while in contact with the sheet material that has been pre-loaded with polymerization catalyst and/or polymerization initiator for the polymerizable monomer. In accordance with the methods disclosed herein, the preliminary step of first loading the sheet material, or the sheet material components, e.g., fibers used to make the sheet material, with a polymerization catalyst or polymerization initiator prior to contacting the sheet material with the polymerizable monomer/clay slurry, provides tenacious interlocking of the polymer and clay within the substrate. Further, large batches of the monomer/clay slurry that are void of polymerization catalyst and/or a polymerization initiator for the polymerizable monomer can be prepared without premature polymerization of the monomer.

Another aspect of the methods and articles disclosed herein is to provide a method of manufacturing a hydraulic barrier in sheet material form containing a liquid-sorbent polymer and a liquid absorbent clay. The polymer and clay are structurally reinforced with a sheet material, particularly a fibrous sheet material, such as a geotextile, woven or non-woven, loaded with a liquid-sorbent polymer and a water-absorbent clay in a weight ratio of polymer:clay in the range of 1:19 to 19:1, preferably in the range of 1:1 to 1:5, more preferably in the range of 1:1 to 1:4, most preferably in the range of 1:2 to 1:4. The geotextile, or the fibers used to make the geotextile, are first loaded with a polymerization catalyst or a polymerization initiator, and thereafter a viscous slurry containing one or more polymerizable monomers and a water-absorbent clay is loaded into the liquid-sorbent polymerization initiating substrate such that monomer polymerization does not begin until the monomer/clay slurry contacts the polymerization initiating substrate, such that the monomer is essentially completely polymerized, in-situ, for tenacious adherence of the polymer and clay to the sheet material. In the preferred embodiment, the polymer is sufficiently cross-linked, e.g., for water insolubility and water absorbency. Sufficient cross-linking is achieved with at least about 0.1% by weight, preferably at least about 0.1%, cross-linker, based on the weight of polymerizable monomer. It is preferred to add the monomer cross-linking agent in a ratio of cross-linking agent to monomer in the range of about 1:100 to 1:1000; more preferably in the range of about 1:250 to 1:750; most preferably in the range of about 1:400 to 1:600.

In the preferred embodiment, the liquid-sorbent substrate is embedded with about 20% to about 50% by weight monomer, and about 50% to about 80% clay, based on the total weight of monomer and clay in the monomer/clay slurry. Preferably, the polymerization solution has a weight ratio of clay to water in the range of about 2:8 to 8:2, more preferably 3:2 to 2:3, most preferably about 1:1. The monomer is polymerized, with water evaporation, until the polymer/clay-containing substrate contains less than about 15% by weight water, preferably less than about 12% by weight water.

The above and other aspects and advantages of the manufacturing method and articles disclosed herein will become more apparent from the following detailed description taken in conjunction with the drawings.

BRIEF DESCRIPTION OF THE DRAWINGS

The FIGURE is a schematic flow diagram of the preferred method of manufacturing a polymer-loaded sheet material.

DETAILED DESCRIPTION OF THE PREFERRED EMBODIMENTS

The present invention may be understood more readily by reference to the following detailed description of the invention and the examples provided therein. It is to be understood that this invention is not limited to the specific components, articles, processes and/or conditions described, as these may, of course, vary. It is also to be understood that the terminology used herein is for the purpose of describing particular embodiments only and is not intended to be limiting.

Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Referring to the drawing, the invention relates to a hydraulic barrier material 10. In one embodiment, the hydraulic barrier material 10 is an interlocking matrix containing a water-absorbent organic polymer and a water-absorbent clay interlocked to and within a liquid monomer-absorbent or liquid monomer-adsorbent substrate, wherein the polymer is formed (polymerized from one or more monomers), in-situ, while in contact with the substrate during manufacture of the hydraulic barrier to interlock the polymer and clay to the substrate. In the preferred embodiment, the hydraulic barrier material 10 is an interlocking matrix of organic polymer molecules, polymer-intercalated clay, polymer-intercalated clay tactoids, exfoliated clay platelets and fibers of a fibrous substrate 12, preferably a non-woven geotextile. The preferred organic polymer is a water-absorbent polymer preferably comprising a mixture of an alkali metal salt of polyacrylic acid (50–90 mole percent—corresponding to 50–90 mole percent neutralization of acrylic acid) and polyacrylic acid (10–50 mole percent). It has been found that the interlocking of the organic polymer, polymer-intercalated clay tactoids, and clay platelets to the substrate 12 provides a hydraulic barrier material 10 having a relatively low permeability to water while containing a relatively low loading of organic polymer.

It has further been found that the hydraulic barrier material 10 provides reduced permeability to water per unit weight of hydraulic barrier material as compared to conventional liners or hydraulic barriers, and in particular, geosynthetic clay liners (GCLs). Particularly, it has been found that the hydraulic barrier material 10 has a hydraulic conductivity of $1 \times 10^{-9}$ cm/sec. or less. Further, it has also been found that the hydraulic barrier material 10 has a reduced thickness and a reduced weight as compared with conventional GCLs, while achieving better water impermeability. The hydraulic barrier material 10 may be particularly suitable for geo-environmental applications such as water absorption, water retention and water containment. For instance, the hydraulic barrier material 10 may have particular application for use in below grade water proofing, such as underground parking garages, shopping malls and the like to prevent ground water intrusion; waste landfills; man-made bodies of water; and other geo-environmental applications where a low permeability hydraulic barrier is required. In the preferred embodiment, the organic polymer is formed from the polymerization of an organic monomer intercalated into a clay, preferably a water-swellable clay. The method of making the hydraulic barrier material 10 includes the steps of embedding a polymerizable organic monomer within a liquid-sorbent substrate after first applying a polymerization catalyst or polymerization initiator to the liquid-sorbent substrate, or to one or more of the component parts of the liquid-sorbent substrate, e.g., to fibers of geotextile during the manufacture of the geotextile, and effecting polymerization of the polymerizable monomer, in situ, to form the hydraulic barrier material 10.

The polymerizable monomer is applied to the polymerization-initiating substrate from a polymerization solution that is a slurry of the polymerizable organic monomer and a water-swellable clay, such as a sodium smectite clay, particularly a sodium montmorillonite or a sodium bentonite clay, to form a slurry 14 that is embedded into the porous substrate 12 that has previously been treated, e.g., contacted or dipped or sprayed, to contain a polymerization catalyst or polymerization initiator for the organic monomer in an amount sufficient to fully polymerize the subsequently embedded monomer. In the preferred embodiment, the substrate 12 is loaded with at least 5% by weight polymerization initiator, or polymerization catalyst, based on total weight of polymerizable monomer subsequently embedded in the substrate from the polymerization solution (polymerization slurry). More preferably, the substrate 12 is loaded with at least 10% by weight polymerization initiator and/or polymerization catalyst based on the weight of subsequently embedded polymerizable monomer.

The polymerizable monomer 6 preferably is mixed with water 7 and includes a neutralizing agent 8, such as sodium hydroxide, preferably prior to the addition of the clay 9, to form the polymerization solution in the form of a slurry 14, in order to more easily effect neutralization of least a portion of the polymerizable organic monomer (most preferably 65–85 mole percent neutralization) before clay addition and subsequent intercalation of the partially neutralized polymerizable organic monomer into the clay. Preferably, the polymerization solution also contains a cross-linking agent 11 for the polymer so that after polymerization, the partially neutralized polymer molecules are cross-linked sufficiently for water-insolubility and water absorbency. Preferably, the polymerizable monomer, water, cross-linking agent, and neutralizing agent are thoroughly mixed to form a homogeneous solution prior to adding clay to form the polymerization solution or slurry for consistency and homogeneity in intercalation of the clay. In the preferred embodiment, the polymerization solution mixing step is performed such that the polymerization solution is substantially homogeneous.

The step of adding clay to the monomer solution to form the polymerization solution or polymerization slurry 14 may be performed in any manner that results in the addition of a desired amount of the clay and monomer to form a slurry 14 that is relatively viscous, but is capable of being moved to the polymerization-initiating substrate 12 for embedment. In addition, the polymerization solution containing the clay is preferably sheared during mixing and/or sheared while embedding the slurry into the liquid-sorbent or porous substrate 12 to intercalate a portion of the polymerizable monomer between clay platelets prior to embedding the slurry 14 into the substrate 12, and preferably to partially exfoliate the clay platelets prior to, or simultaneously with, contacting the substrate 12 with the polymerization solution.

The degree of mixing of the slurry 14 will vary depending upon the desired characteristics of the slurry 14. For instance, the clay may be simply combined together with the polymerization solution with no concern regarding the degree of mixing or homogeneity of the resulting slurry 14. Preferably, the mixing step is preformed such that the slurry 14 is mixed and sheared prior to the subsequent embedding of the slurry 14 into the catalyst- or initiator-containing porous substrate 12. In the preferred embodiment, the mixing step used to form the slurry is performed such that the slurry 14 is substantially homogeneous.

Any mixer 16 and any mixing method may be used which are capable of mixing the clay and the monomer to achieve the desired characteristics of the slurry 14. Thus, in the preferred embodiment, any mixer 16 and any mixing process may be used which are capable of mixing the clay and the polymerization solution such that the resulting slurry 14 is substantially homogeneous. Further, the mixing step may be performed for any period or length of time sufficient to achieve the desired characteristics of the slurry 14. In the preferred embodiment, the mixing step is performed for a length of time sufficient to mix the clay and the polymerization solution such that the resulting slurry 14 is substantially homogeneous. Minimum water is preferably used to obtain a homogeneous slurry, while producing a slurry that is capable of being mechanically conveyed or pumped to the substrate 12 for embedding the slurry into the substrate. As shown in FIG. 1, in the preferred embodiment, a piston 32 of piston pump assembly 30 is used to convey the high viscosity slurry to the liquid-sorbent substrate for the embedding step. If the slurry is too viscous for pumping, a conveyor belt, preferably having a slurry-covered width that is the same as the substrate 12, can be used to move the slurry to the substrate 12.

As indicated above, the monomer embedding step comprises commingling the polymerizable organic monomer/clay slurry with the substrate 12.

In the preferred embodiment, the slurry 14 is embedded within the catalyst-containing, liquid-sorbent substrate 12 at a slurry viscosity of about 30,000 centipoises to about 80,000 centipoises, more preferably about 40,000 to about 60,000 centipoises, for absorption and/or adsorption of the slurry 14 into and/or between the components of the substrate 12. The slurry 14 is received into at least a portion of the thickness of the substrate 12. Any amount or degree of embedding of the slurry 14 into, or between the component parts of the substrate 12 is acceptable so long as the embedding of the monomer is sufficient to permit the commingling and sorption of the monomer and clay between and/or within the component parts, e.g., the fibers of the substrate, for subsequent polymerization of the monomer internally within at least a portion of the thickness of the substrate to form the hydraulic barrier material 10. Further, the degree or amount of embedding is sufficient if it permits the bonding or interlocking of the resulting absorbent polymer and clay within at least a portion of the thickness of the porous substrate 12.

Preferably, the embedding step includes combining the substrate 12, and the slurry 14 such that the slurry 14 is distributed uniformly throughout at least a portion of the thickness of the substrate 12. The slurry 14 is preferably well mixed, and more preferably is substantially homogeneous, so that combining the slurry 14 and the substrate 12 also results in the distribution of the monomer, monomer-intercalated clay, and exfoliated clay platelets throughout a desired thickness of the substrate 12. More preferably, the slurry is distributed throughout the entire thickness of the porous substrate 12 in order to facilitate the production of a relatively homogeneous hydraulic barrier material 10.

As discussed previously, the porous substrate 12 may be any porous material or substance compatible with the monomer and any other components contained with the polymerization slurry 14, where applicable. Any porous substrate may be used that is able to receive and retain at least a portion of both the polymerization catalyst or polymerization initiator, and subsequently the polymerizable monomer (s) and clay to form the hydraulic barrier material 10 upon the polymerization of the monomer. More preferably, the porous substrate is comprised of a fibrous substrate 12 having a plurality of fibers. Any fibrous substrate 12 can be used that is able to form the hydraulic barrier material 10 upon the polymerization of the monomer.

In the preferred embodiment, the substrate 12 is a geotextile material. Any woven or non-woven geotextile material may be used, preferably non-woven. Further, the geotextile material may be in any form compatible with providing the desired hydraulic barrier material 10. However, in the preferred embodiment, the fibrous substrate 12 is a substantially planar sheet comprising at least one layer of geotextile material.

In the preferred embodiment, the embedding step is comprised of embedding the slurry 14, having a water content of less than 50% by weight, and thus the monomer and clay, between the fibers of the initiator- or catalyst-containing fibrous substrate 12. The embedding step may be performed in any manner, and by any apparatus, resulting in the embedding of the high viscosity slurry 14 between, and/or absorbed within the component parts, e.g., fibers, of the substrate 12. In other words, the slurry 14 can be embedded or directed within the interstitial spaces or voids between and/or absorbed within the fibers of the fibrous substrate 12, and/or may be absorbed by the fibers of the substrate 12. For instance, the slurry 14 may be embedded between the fibers of the fibrous substrate 12 by vacuum, scrubbing, rolling, hydraulic loading, pressure filtration or spraying. If the fibers themselves are water-absorbent, the monomer will be absorbed into the fibers as well.

In the preferred embodiment, at least a portion of the slurry 14 is embedded between the fibers of the fibrous substrate 12 in the interstitial spaces or voids. The remainder or balance of the slurry 14 which is not embedded may be dispersed or spread among the fibers of the fibrous substrate 12 or distributed upon or about the fibers to provide a layer or coating of the slurry 14. Any amount or degree of embedment of the slurry 14 between the fibers of the substrate 12, sufficient to permit the subsequent polymerization of the monomer, is acceptable.

In the preferred embodiment, the bulk or major fraction or proportion of the slurry 14 is embedded in the substrate 12, while a small or minor fraction or proportion of the slurry 14 optionally may be dispersed or distributed on top of the substrate 12. Preferably, any slurry 14 that may be distributed on top of the substrate 12 has a thickness of less than about 2.0 mm, more preferably less than about 1.0 mm, most preferably less than about 0.50 mm.

Further, in the preferred embodiment, the slurry 14 is embedded between the fibers of the fibrous substrate 12 by applying a compressive force to the fibrous substrate 12. The compressive force is preferably applied in a direction substantially perpendicular to the plane of the fibrous substrate 12, as discussed further below. The compressive force may be applied in any manner, and by any method, or apparatus that results in the desired degree or amount of embedding of the slurry 14 between the fibers of the fibrous substrate 12.

For instance, the compressive force may be applied to the fibrous substrate 12 with at least one pair of pressure rollers 18 as shown in FIG. 1. In addition, the compressive force may be applied to the fibrous substrate 12 using a vacuum.

Following the embedding step, the process comprises the step of effecting the polymerization of the monomer to form the hydraulic barrier material 10. The polymerization of the monomer may be effected in any manner, and by and method, process, apparatus or device, capable of, and suitable for, polymerizing the monomer to form a hydraulic barrier material 10 having the desired properties and characteristics. Preferably, polymerization of the monomer is effected by heating the monomer in a continuous oven after the embedding step. Preferably, the heating step is sufficient to dry the hydraulic barrier to less than about 15% by weight moisture, more preferably about 7–12% by weight moisture based on the day weight of the hydraulic barrier 10.

The heating step may be performed at any temperature above the boiling point of water to polymerize the monomer and form the hydraulic barrier material 10. However, the temperature of the heating step may vary depending upon the desired characteristics and properties of the resulting hydraulic barrier material 10. It has been found that the slurry 14 is preferably heated to a temperature of at least 100° C. (212° F.), more preferably about 149° C. to about 288° C., most preferably about 177° C. to about 288° C., particularly about 204° C. to about 260° C. In the most preferred embodiment, the slurry 14 is heated to a temperature of between about 232° C. and about 260° C.

Any heater 34 and any heating process may be used which are capable of heating the slurry 14, and thus the monomer, to the desired temperature to polymerize the monomer while embedded within substrate 12, without melting or otherwise degrading the substrate 12. Further, the heating step may be performed for any length of time sufficient to form a hydraulic barrier material 10 having the desired water barrier properties. For instance, the heating step may be performed for a period between about 30 seconds and about 2 hours. However, the amount of the monomer polymerized by the heating step may vary depending upon the length and temperature of the heating step, which may affect the characteristics or properties of the resulting hydraulic barrier material 10. Further, the duration of the polymerization reaction or the period of performance of the heating step has been found to be inversely proportional to the polymerization temperature.

In accordance with an important advantage of the preferred embodiment of the manufacturing method disclosed herein, no significant polymerization of the monomer occurs prior to embedding the polymerization slurry into the substrate 12, with most polymerization occurring during the indicated polymerization step or heating step, since the polymerization catalyst or polymerization initiator is isolated from the monomer until the monomer is embedded in the substrate 12. Thus, in the preferred embodiment, no significant polymerization of the monomer occurs prior to the embedding of the slurry 14 between the fibers of the initiator- or catalyst-containing fibrous substrate 12. Thus, prior to the heating step, the polymerization of the monomer does not occur until the monomer is embedded within the initiation- or catalyst-loaded substrate. The inhibiting of monomer polymerization prior to the monomer embedding step is a significant advantage of the manufacturing method disclosed herein. As well, depending upon the intended application of the hydraulic barrier material 10, the hydraulic barrier material 10 may optionally include a covering sheet and/or a carrier sheet (not shown). Specifically, the covering sheet is preferably applied along at least one side of the substrate 12, being a geotextile material in the preferred embodiment.

In the preferred embodiment, the substrate 12 can be any water-absorbent or water-adsorbent sheet material. Further, the substrate 12 is preferably a fibrous substrate having a plurality of fibers. More preferably, the fibrous substrate 12 is a geotextile material. Any geotextile material, including both woven and non-woven geotextiles, having any weight and formed from any material capable of withstanding the polymerization temperature, may be used which is compatible with the intended application of the hydraulic barrier material 10 and which will provide a hydraulic barrier material 10 having the desired water barrier properties. However, preferably, the geotextile material has a unit weight of between about 0.05 and 0.80 kg/m$^2$, more preferably between 0.10 to 0.40 kg/m$^2$, most preferably between 0.10 to 0.20 kg/m$^2$.

Further, the geotextile material may be in any form compatible with providing the desired hydraulic barrier material 10 in any size or shape to fit any area to be protected against substantial water contact. In the preferred embodiment, the fibrous substrate 12 is a substantially planar sheet comprising at least one layer of the geotextile material. Thus, as discussed above, in the preferred monomer embedding step, a compressive force is applied in a direction substantially perpendicular to the plane of the geotextile material 12. In the preferred embodiment, the fibrous substrate 12 is comprised of a layer of geotextile material, such as PETROMAT 4597, PETROMAT 4551 or PETROMAT 4506 manufactured by Amoco, or, more preferably, a polyester material GEO-4-REEMAY 60, manufactured by Foss, Inc., having a thickness of 2 mm; or another polyester material, 25WN040-60, manufactured by CUMULUS Corporation, at a thickness of 5 mm.

In the preferred embodiment, the aqueous polymerization solution includes water, a polymerizable organic monomer, and a water-swellable clay. Any organic monomer able to be polymerized to provide a water-absorbent organic polymer, may be used. However, preferably, the organic monomer has the following structural formula:

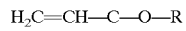

wherein R is selected from the group consisting of an alkali metal, H, $CH_3$, $CH_2CH_3$, $CH(CH_3)_2$; and mixtures thereof.

In the preferred embodiment, the monomer is selected from the group consisting of acrylic acid, an alkali metal acrylate, e.g., sodium acrylate, and particularly mixtures thereof containing 50–90 mole percent of an alkali metal acrylate and 10–50 mole percent acrylic acid, more preferably about 65–85 mole percent alkali metal acrylate and 15–35 mole percent acrylic acid, based on the total moles of polymerizable acrylic acid monomer.

It has been found that the weight ratio of the organic monomer (or polymer) to clay embedded into the substrate sufficient to produce the desired hydraulic barrier material 10 most efficiently, with little to no drying required after monomer polymerization, should be in the range of 1:1 to 1:5, preferably in the range of 1:1 to 1:4, most preferably in the range of 1:2 to 1:4, based on the total weight of monomer, neutralized monomer and clay in the slurry.

The invention disclosed herein is useful for loading any porous substrate, particularly sheet material, with a monomer/clay slurry wherein the polymer is polymerized, in-situ, after pre-loading the porous substrate with sufficient polymerization catalyst and/or polymerization initiator to completely polymerize the polymerizable monomer(s) while in contact with the substrate 12, without premature monomer polymerization.

The polymerization solution preferably also includes a cross-linker for the monomer. Any cross-linker compatible with the organic monomer and capable of, and suitable for, cross-liking the organic monomer may be used. However, the cross-linker is preferably selected from the group consisting of phenol formaldehyde, terephthaladehyde, and N,N'-methylene bisacrylamide (MBA) and mixtures thereof. In the preferred embodiment, the cross-linker is comprised of N,N'-methylene bisacrylamide.

Any amount of the cross-linker or any ratio of the cross-linker to the monomer sufficient to cross-link the monomer to the desired degree may be used. However, as indicated above, the actual amount or ratio of cross-linker used will vary depending upon, among other factors, the desired characteristics or properties of the hydraulic barrier material 10, including its water-absorbing capacity (WAC). For instance, it has been found that as the ratio of the cross-linker to the monomer is increased, the water solubility of the resulting absorbent polymer tends to decrease. However, in addition, as the ratio of the cross-linker to the monomer is increased, the WAC of the resulting absorbent polymer tends to decrease. Thus, a desired balance must be achieved between the WAC and the water solubility of the absorbent polymer comprising the hydraulic barrier material 10. In one embodiment, the ratio by weight of the cross-linker to the monomer contained in the slurry 14 is less than about 1:100, preferably between about 1:1000 and about 1:100, more preferably in the range of 1:750 to 1:250, most preferably in the range of 1:600 to 1:400.

Further, the polymerization solution is preferably an acidic solution. Specifically, the polymerization solution preferably has a pH level of less than 7. The pH level of the polymerization solution may be adjusted in any manner and by any substance or compound able to provide the acidic solution and which is compatible with the components comprising the polymerization solution. However, the polymerization solution is preferably further comprised of a sufficient amount of a caustic compound to neutralize preferably 50–100 mole %, more preferably 50–90 mole % of the monomer, e.g., acrylic acid, which forms a neutralized polyacrylate, in-situ, most preferably 65–85 mole %.

Any caustic compound can be used that is capable of at least partially neutralizing the monomer or the formed polymer. Preferably, the caustic compound is selected from the group consisting of sodium hydroxide, potassium hydroxide, ammonium hydroxide, and mixtures thereof. In the preferred embodiment, the caustic compound is sodium hydroxide.

As indicated previously, an amount of water-swellable clay is preferably added to the polymerization solution to form the slurry 14. Any water-swellable clay able to be intercalated with polymerizable monomer after being hydrated in water and mixed with the polymerization solution to form the slurry 14, as described above, may be used. Preferably, the clay is a water-swellable clay selected from the group consisting of montmorillonite, saponite, nontronite, laponite, beidellite, iron-saponite, hectorite, sauconite, stevensite, vermiculite, and mixtures thereof. The preferred water-swellable clays are smectite clays, preferably a sodium smectite clay, particularly sodium montmorillonite and sodium bentonite. Other, non-water-swellable clays or fillers can be added to the polymerization solution, such as calcium carbonate, talc, mica, vermiculite, acid activated clays (where a hydrogen ion has replaced the sodium) kaolin, talc, silicon dioxide, titanium dioxide, calcium silicate, calcium phosphate and the like, so long as the polymerization solution includes at least about 5% water-swellable clay, preferably at least about 20% by weight water-swellable clay, based on the weight of polymerizable monomer in the polymerization slurry 14.

The particular weight ratio or relative amounts of the organic monomer and clay will be selected to fall within the ratio of about 20% to about 50% by weight monomer (including neutralizing agent) and about 50% to about 80% by weight clay, based on the total weight of monomer, neutralized monomer and clay in the polymerization slurry.

Finally, as indicated previously, the aqueous slurry 14, includes an amount of water, preferably fresh water. In accordance with an important feature of the preferred methods and articles described herein, the polymerization slurry 14 should contain less than about 50% by weight water, preferably less than about 45% by weight water, based on the total weight of the slurry 14. Preferably, the slurry 14 comprises between about 30 percent and about 50 percent water by total weight of the slurry 14. In the preferred embodiment, the slurry 14 includes between about 35 percent by weight and about 45 percent by weight water based on the total weight of the slurry 14, to permit pumping via piston 32. A slurry having as low as about 20% by weight water can be conveyed to the substrate 12 for embedding into the substrate using a conveyor (not shown) while providing sufficient water for homogeneous distribution of the monomer throughout the clay.

Referring to the drawing, an apparatus and method are provided for continuously producing the hydraulic barrier material 10. First, a layer of the geotextile material comprising the fibrous substrate 12 is fed through a bath of polymerization catalyst or polymerization initiator 20 and passed through a pair of squeeze rollers 22 to remove excess catalyst and/or initiator. Alternatively, the polymerization catalyst and/or polymerization initiator can be spray-applied to the substrate 12 from spray nozzles 31. In accordance with a preferred embodiment, the substrate is saturated with the polymerization catalyst and/or polymerization initiator followed by applying vacuum to the undersurface 33 of the saturated substrate 12 by vacuum device 35 that is in contact with the undersurface 33 of the saturated substrate 12 for removal of the excess polymerization catalyst and/or polymerization initiator for recycle to the process. The catalyst-loaded and/or initiator-loaded fibrous substrate 12, after removal of excess catalyst and/or initiator, then is fed under guide roller 24 and between a pair of horizontally disposed embedding rollers 18, where the slurry 14 is squeezed (compressed) into the catalyst-containing and/or initiator-containing substrate 12.

The slurry 14 is mixed in slurry container 26 where the slurry components are mixed with a mixer 16. Once mixed and preferably sheared in slurry container 26, the mixer 16 includes slurry scrapers 17 and is raised from the container 26 and the container 26 is moved along tracks 28 so that the container 26 is disposed directly under piston pump assembly 30 that includes a high pressure, vertically moveable piston 32. Piston 32 then is moved downwardly within container 26 to force the high viscosity, low water content slurry 14 through a flexible 8 inch diameter conduit 29 for spreading the slurry into a V-shaped slurry-receiving trough 39 between the squeeze rollers 18. The high viscosity slurry 14 is difficult to force through a narrow conduit so that it is preferred to use a conduit 29 that has a diameter of at least about 4 inches. Between the embedding rollers 18, the slurry 14 is deposited onto the layer of the geotextile comprising the fibrous substrate 12 containing a polymerization-initiating catalyst and/or initiator, as the substrate 12 is moved between the embedding rollers 18. As shown in FIG. 1, the geotextile material 12 containing the polymerization catalyst and/or polymerization initiator passes in contact with embedding rollers 18, which applies a compressive force to embed the slurry 14 between the fibers of the fibrous substrate 12.

The compressed geotextile with the embedded slurry 14 then passes through a heater or oven 34 for polymerizing the monomer and to interlock the resulting polymer and the clay into the substrate 12. The polymerization results in the interlocking of the resulting polymer and clay with the fibers of the geotextile material. As a result, the hydraulic barrier material 10 is formed. If desired, the hydraulic barrier material 10 may be subsequently dried and later rolled and packaged.

The hydraulic barrier material 10 will expand when contacted with water. It has been found that upon contact with water, the unfilled voids or interstitial spaces of the fibrous substrate 12 will first fill up with hydrated polymer gel. Further hydration of the polymer gel will cause the entire hydraulic barrier material 10 to expand. Further, it has been found that under a standard load of an effective confining stress of 20 kPa, the hydraulic conductivity of the hydraulic barrier material described herein tends to be less than or equal to about $1 \times 10^{-9}$ cm/sec. Further, the hydraulic conductivity has been generally found to decrease as the effective confining stress is increased.

EXAMPLES

A polymerization slurry was mixed containing 354 pounds (11.91% by weight) acrylic acid; 1119 pounds (37.65% by weight) of sodium montmorillonite clay; 314 pounds of 50% active NaOH solution (5.28% by weight active NaOH); 1184 pounds of water (45.12% by weight-including water added with NaOH); and 0.772 pounds (0.03% by weight) of methylene bisacrylamide (MBA) cross-linking agent. The NaOH added was sufficient to neutralize 80 mole percent of the acrylic acid.

The slurry was embedded in the Foss, Inc. GEO-4-REEMAY 60 polyester fabric having a thickness of 2 mm and a basis weight of 0.034 pound/ft$^2$ that was pre-dipped in a polymerization initiator (a sodium persulfate solution containing 16–30% active sodium persulfate) to fully saturate the sheet material such that the fabric, after vacuum removed of excess initiator, contains 2.8 grams of sodium persulfate initiator per ft$^2$ of fabric prior to embedding the slurry therein. In the preferred embodiment, the fabric is loaded with 4 to 14 grams of sodium persulfate aqueous solution (28% active) on each square foot of fabric to total 2.8 grams of sodium persulfate per square foot, and the polymerization-initiating fabric is subsequently embedded with 28 grams per square foot of acrylic acid. The preferred wet loading of the polymerization solution is 232 grams of slurry square foot of fabric. Five different samples were prepared, each loaded with different weights of the slurry and each polymerized, in-situ, at different oven temperatures. The data shown in Table I shows that at the lower temperatures of 191° C. to 232° C., better impermeabilities resulted in testing both deionized water permeability (DI Perm) and 3.5% NaCl water (3.5% Salt Perm):

TABLE I

| Sample | Oven Temp deg C. | Loading lb/sq. ft. | Free Swell (wet wt/ dry wt) | DI Perm cm/s | 3.5% Salt Perm cm/s |
|---|---|---|---|---|---|
| 1 | 191 | 0.2766 | 13.307 | $7.80 \times 10^{-10}$ | $1.70 \times 10^{-10}$ |
| 2 | 204 | 0.2959 | 12.004 | $9.06 \times 10^{-10}$ | $2.40 \times 10^{-10}$ |
| 3 | 218 | 0.2823 | 13.510 | $1.20 \times 10^{-09}$ | $2.90 \times 10^{-10}$ |
| 4 | 232 | 0.2488 | 14.362 | $8.40 \times 10^{-10}$ | $2.60 \times 10^{-10}$ |
| 5 | 246 | 0.2877 | 14.318 | $8.30 \times 10^{-10}$ | $6.00 \times 10^{-10}$ |

TABLE II

Comparative Prior Art
ST Bentomat Hydraulic Barrier

| Clay Loading | DI Permeability | Saltwater Permeability cm/sec. |
|---|---|---|
| 0.85 lb/ft$^2$ | $2.60 \times 10^{-9}$ cm/sec. | $5.0 \times 10^{-6}$ cm/sec. |

A comparison of the water permeability achieved in according with the hydraulic barriers described herein (Table I) with a typical prior art ST Bentonite Hydraulic Barrier (Table II) shows very unexpectedly low water permeability for the hydraulic barriers manufactured in accordance with the present invention, particularly for salt-contaminated water. The prior art hydraulic barrier compositions, having about 3 times as much clay loading, permit about 3000 times more salt-contaminated water to pass through than the hydraulic barrier compositions described herein. For deionized water, the prior art hydraulic barrier compositions, again containing about 3 times the weight of clay loaded therein, compared to the clay loading of the compositions described herein, permits about 3 times more deionized water to pass through the composition than the hydraulic barrier compositions described herein.

What is claimed is:

1. A method of manufacturing a water-absorbent sheet material comprising:
   contacting a liquid-sorbent sheet material, or material used to make the liquid-sorbent sheet material, with a polymerization catalyst and/or a polymerization initiator to form a polymerization-initiating sheet material for a subsequently embedded monomer;
   embedding the polymerization initiating sheet material with a clay-containing slurry comprising water; clay; and a monomer capable of polymerizing to form a water-sorbent polymer, wherein the water is less than about 50% by weight of the slurry, and the weight ratio of monomer to clay is in the range of about 1:19 to about 19:1, throughout at least a portion of the thickness of the polymerization-initiating sheet material for intimate contact with said polymerization catalyst or polymerization initiator to initiate polymerization of the monomer; and
   heating the embedded sheet material at a temperature sufficient to polymerize the monomer and vaporize at least a portion of the slurry water to form a water sorbent polymer and to interlock the polymer and clay in the sheet material.

2. A method in accordance with claim 1, wherein the clay-containing slurry contains a polymerization initiator and a cross-linking agent for the polymer.

3. A method in accordance with claim 1, wherein the sheet material, or a material contained in she sheet material, is loaded with the polymerization catalyst or polymerization initiator for the monomer prior to embedding the slurry into the sheet material.

4. A method in accordance with claim 1 wherein the slurry includes an alkali neutralizing agent for the monomer or formed polymer.

5. A method in accordance with claim 4, wherein the alkali neutralizing agent is loaded into the sheet material in an amount sufficient to neutralize the polymer 65–85 mole percent.

6. A method in accordance with claim 1, wherein the sheet material is heated to a temperature of at least 100° C. to effect polymerization of the monomer in the shoot material and to evaporate water from the shoot material during polymerization of the polymer.

7. A method in accordance with claim 6, wherein the sheet material is conveyed through an oven having a temperature of about 100° C. to about 288° C. to polymerize the monomer and cure the in-situ formed polymer.

8. A method in accordance with claim 7, wherein the oven has a temperature in the range of about 177° C. to about 288° C.

9. A method in accordance with claim 8, wherein the oven has a temperature in the range of about 232° C. to about 260° C.

10. A method in accordance with claim 4, wherein the clay-containing slurry contains clay in at amount of about 50% to about 80% by weight, based on the weight of clay and neutralized monomer.

11. A method in accordance with claim 10, wherein the clay-containing slurry contains about 30% to about 50% by weight water, based on the total weight of the clay-containing slimy.

12. A method in accordance with claim 11, wherein the clay-containing slurry contains about 35% to about 45% by weight water, based on the total weight of the clay-containing slurry.

13. A method in accordance with claim 12, wherein the clay-containing slurry contains about 35% to about 40% by weight water, based on the total weight of the polymerization solution.

14. A method in accordance with claim 1, wherein the clay comprises a water-swellable smectite clay.

15. A method in accordance with claim 14, wherein the water-swellable smectite clay comprises a sodium smectite clay.

16. A method in accordance with claim 15, wherein the sodium smectite clay is selected from the group consisting of sodium montmorillonite, sodium bentonite, and mixtures.

17. A method in accordance with claim 16, wherein the sodium smectite clay is produced by ion-exchanging sodium ions in place of calcium ions of calcium smectite clay.

18. A method in accordance with claim 1, wherein the weight ratio of monomer to clay is in the range of 1:1 to 1:5.

19. A method in accordance with claim 18, wherein the weight ratio of monomer to clay is in the range of 1:1 to 1:4.

20. A method in accordance with claim 19, wherein the weight ratio of monomer to clay join the range of 1:2 to 1:4.

21. A method of manufacturing a water-absorbent sheet material comprising:
    embedding a liquid-sorbent sheet material or material used to make the liquid-sorbent sheet material with a polymerization initiator or polymerization catalyst in an amount sufficient to initiate polymerization of a later added polymerizable monomer to produce a polymerization-initiating sheet material;
    embedding a polymerization slurry, containing water, clay and a polymerizable monomer, said slurry having a water content less than 50% by weight, throughout at least a portion of the thickness of the polymerization-initiating sheet material for intimate contact with said polymerization catalyst or polymerization initiator to initiate polymerization of the monomer; and
    subjecting the sheet material to conditions sufficient to polymerize the monomer, in-situ, to form a polymer, thereby securing the polymer and clay to the sheet material.

22. A method in accordance with claim 21, wherein the polymerization slurry contains a cross-linking agent for the polymer, but contains no polymerization catalyst or polymerization initiator.

23. A method in accordance with claim 22, wherein the polymerization slurry includes a carrier selected from the group consisting of water, an organic solvent, and the polymerizable monomer in an amount sufficient to solubilize or disperse the cross-linking agent throughout the monomer.

24. A method in accordance with claim 21, wherein the sheet material, or a material contained in the sheet material, is loaded with a cross-linking agent and a neutralizing agent for the monomer in addition to the polymerization catalyst or polymerization initiator, prior to embedding the monomer into the sheet material.

25. A method in accordance with claim 24, wherein the neutralizing agent is loaded into the sheet material in an amount sufficient to neutralize the monomer or formed polymer 50–100 mole percent.

26. A method in accordance with claim 24, wherein the neutralizing agent is loaded into the sheet material in an amount sufficient to neutralize the polymer 65–85 mole percent.

27. A method in accordance with claim 21, wherein the sheet material is heated to a temperature of at least 100° C. to effect polymerization of the monomer in the sheet material and to evaporate water from the sheet material during polymerization and curing of the polymer.

28. A method in accordance with claim 27, wherein the sheet material is conveyed through an oven having a temperature of about 177° C. to about 288° C. to polymerize the monomer and cure the in-situ formed polymer.

29. A method in accordance with claim 28, wherein the oven has a temperature in the range of about 204° C. to about 260° C.

30. A method in accordance with claim 21, wherein the polymerization slurry contains clay in an amount of 5% to about 95% by weight, based on the total weight of clay and monomer.

31. A method in accordance with claim 21, wherein the clay comprises a water-swellable smectite clay.

32. A method in accordance with claim 31, wherein the water-swellable smectite clay comprises a sodium smectite clay.

33. A method in accordance with claim 32, wherein the sodium smectite clay is selected from the group consisting of sodium montmorillonite, sodium bentonite, and mixtures.

34. A method iii accordance with claim 21, wherein the polymerization slurry contains about 20% to about 50% by weight water, based on the total weight of the polymerization slurry.

35. A method in accordance with claim 32, wherein the polymerization slurry contains shout 30% to about 50% by weight water, based on the total weight of the polymerization slurry.

36. A method in accordance with claim 21, wherein the polymerization slurry contains about 30% to about 40% by weight water, based on the total weight of the polymerization slurry.

37. A method in accordance with claim 21, wherein the clay comprises a water-swellable smectite clay in an amount of at least about 50% by weight, based on the total weight of the polymerization slurry.

38. A method in accordance with claim 21, wherein the clay comprises 50–100% by weight smectite clay, based on the total weight of clay in the polymerization slurry.

39. A method of manufacturing a water-absorbent substrate comprising:

contacting a liquid-sorbent substrate, or material used to make the liquid-sorbent substrate, with a polymerization catalyst and/or a polymerization initiator to form a polymerization-initiating substrate for a subsequently embedded monomer;

embedding the polymerization initiating substrate with a clay-containing slurry comprising water clay; and a monomer capable of polymerizing to form a water-sorbent polymer, wherein the water is less than about 50% by weight of the slurry, and the weight ratio of monomer to clay is in the range of about 1:19 to about 19:1, throughout at least a portion of the thickness of the polymerization-initiating substrate for intimate contact with said polymerization catalyst or polymerization initiator to initiate polymerization of the monomer; and heating the embedded substrate at a temperature sufficient to polymerize the monomer and vaporize at least a portion of the slurry water to form a water sorbent polymer and to interlock the polymer and clay in the substrate.

40. A method in accordance with claim 39, wherein the clay-containing slurry contains a polymerization initiator and a cross-linking agent for the polymer.

41. A method in accordance with claim 39, wherein the substrate, or a material contained in the substrate, is loaded with the polymerization catalyst or polymerization initiator for the monomer prior to embedding the slurry into the substrate.

* * * * *

UNITED STATES PATENT AND TRADEMARK OFFICE
CERTIFICATE OF CORRECTION

PATENT NO. : 6,783,802 B2
DATED : August 31, 2004
INVENTOR(S) : Jerald W. Darlington, Jr. et al.

It is certified that error appears in the above-identified patent and that said Letters Patent is hereby corrected as shown below:

Column 13,
Lines 40-41, delete "shoot" and insert -- sheet --;
Line 53, delete "at" and insert -- an --;
Line 59, delete "slimy" and insert -- slurry --;

Column 14,
Line 16, delete "join" and insert -- in --;
Line 20, after "sheet material" insert -- , --; and Column 15,
Line 16, delete "iii" and insert -- in --.

Signed and Sealed this

Twenty-fourth Day of May, 2005

JON W. DUDAS
*Director of the United States Patent and Trademark Office*